United States Patent
Durrant

(10) Patent No.: US 10,761,277 B2
(45) Date of Patent: Sep. 1, 2020

(54) HERMETIC OPTICAL FIBER STUB WITH CONNECTOR INTERFACE AND VENT

(71) Applicant: Optical Fiber Packaging, Ltd., Haverhill, Suffolk (GB)

(72) Inventor: Richard C. E. Durrant, Crystal Lake, IL (US)

(73) Assignee: Optical Fiber Packaging, Ltd. (GB)

(*) Notice: Subject to any disclaimer, the term of this patent is extended or adjusted under 35 U.S.C. 154(b) by 0 days.

(21) Appl. No.: 16/572,725

(22) Filed: Sep. 17, 2019

(65) Prior Publication Data

US 2020/0088957 A1    Mar. 19, 2020

Related U.S. Application Data

(60) Provisional application No. 62/732,493, filed on Sep. 17, 2018.

(51) Int. Cl.
*G02B 6/42* (2006.01)

(52) U.S. Cl.
CPC ................................. *G02B 6/421* (2013.01)

(58) Field of Classification Search
CPC ..... G02B 6/421; G02B 6/3861; G02B 6/3855; G02B 6/3846
See application file for complete search history.

(56) References Cited

U.S. PATENT DOCUMENTS

| | | | |
|---|---|---|---|
| 6,536,956 B2* | 3/2003 | Luther | G02B 6/3885 385/86 |
| 2003/0021548 A1* | 1/2003 | Luther | G02B 6/3885 385/86 |
| 2020/0088957 A1* | 3/2020 | Durrant | G02B 6/3846 |
| 2020/0150352 A1* | 5/2020 | Durrant | G02B 6/381 |

* cited by examiner

*Primary Examiner* — Andrew Jordan
(74) *Attorney, Agent, or Firm* — Chicago IP Law; Stevens M. Evans

(57) ABSTRACT

A vent or slot is provided between the ferrule and stub body that enables gases generated from the low melting glass sealing process of an optical fiber to the ferrule stub to escape, thus creating a stronger and more resilient and reliable seal between the optical fiber and low melting point glass and the stub body, creating the hermetic seal. Without such a vent, which is the conventional configuration, generated gases are forced into the molten glass during the sealing process, thus reducing the strength or resilience of the hermetic seal.

12 Claims, 3 Drawing Sheets

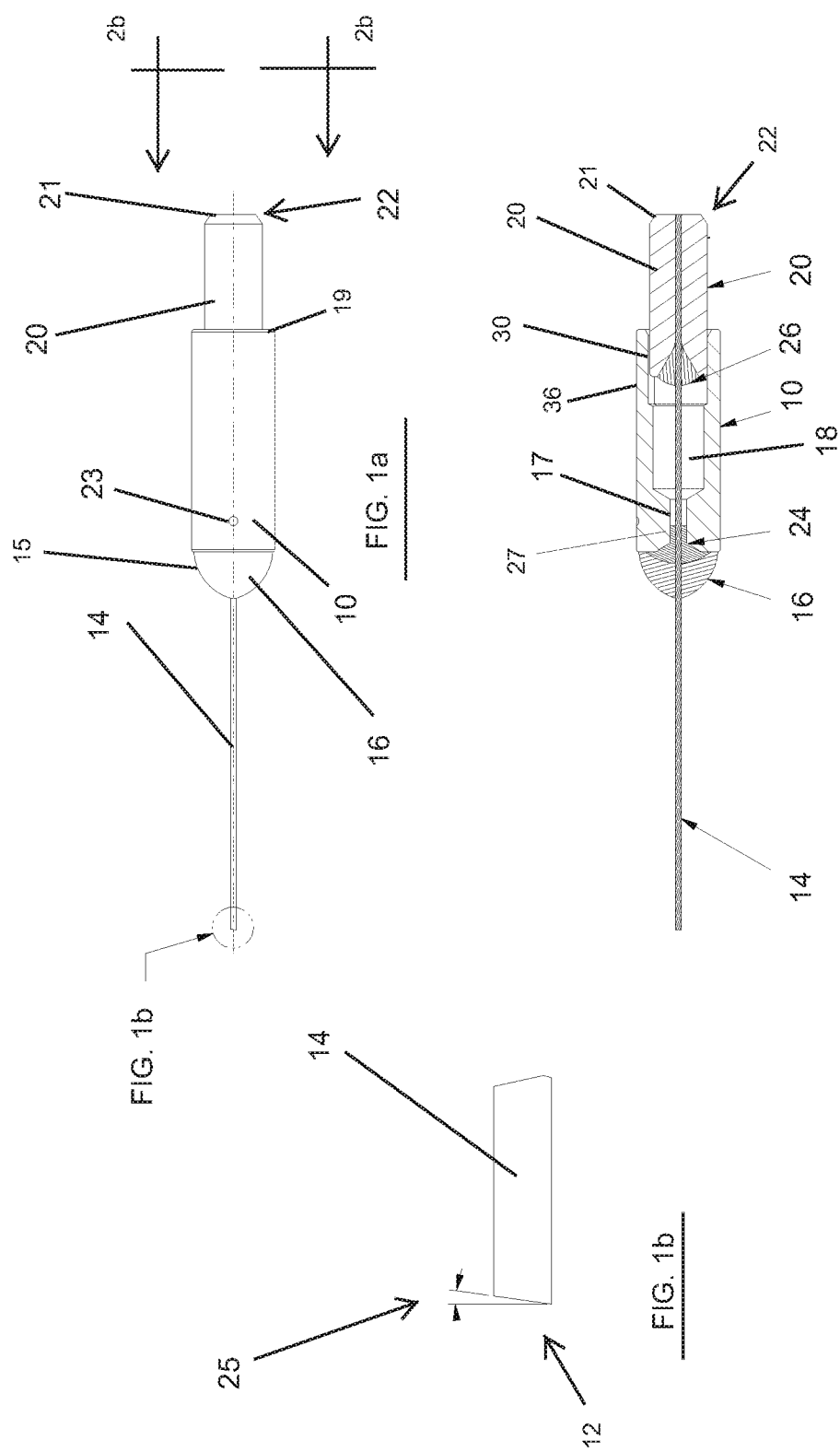

HERMETIC OPTICAL FIBER STUB WITH CONNECTOR INTERFACE AND VENT

CROSS-REFERENCE TO RELATED APPLICATION

This non-provisional patent application claims priority to provisional patent application having application No. 62/732,493, filed on Sep. 17, 2018, and entitled "Hermetic Optical Fiber Stub with Connector Interface," which is hereby incorporated by reference.

BACKGROUND OF THE INVENTION

Field of the Invention

The present invention relates generally to optical fiber connectors, and more particularly, to optical fiber stubs.

Description of Related Art

Fiber stubs are used in telecommunication systems and devices for systems such as for Transmit Optical Sub Assemblies (TOSAs) and Receiving Optical Sub Assemblies (ROSAs). A fiber stub has two ends. One end includes an optical fiber mounted within a ferrule or connector interface. Normally the opposing end of a fiber stub has the fiber coupled directly or indirectly to an emitter or receiver electrooptic device, which is located within the optoelectronic module. The optical fiber includes both a core and a cladding. The optical fiber includes glass materials with several refractive indices, typically one with a higher numerical aperture that clads to another at the core of the fiber.

ASPECTS AND SUMMARY OF THE PRESENT INVENTION

One aspect of the present invention is to enable gases created during the sealing process used with hermetic version, if the fiber stub is to be glass sealed at one end, to escape without damaging the hermeticity of the glass seal itself.

Another aspect of the present invention is to reduce manufacturing costs.

A further aspect of the present invention is to produce resilient hermetic seals in hermetic fiber stubs.

In order to achieve these and other aspects, the present invention provides a vent or slot between the ferrule and stub body that enables gases generated from the low melting glass sealing process of an optical fiber to the ferrule stub to escape, thus creating a stronger and more resilient and reliable seal between the optical fiber and low melting point glass and the stub body, creating the hermetic seal. Without such a vent, which is the conventional configuration, generated gases are forced into the molten glass during the sealing process, thus reducing the strength or resilience of the hermetic seal.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

BRIEF DESCRIPTION OF THE DRAWINGS

FIG. 1a is a side view of a hermetic stub fiber body, ferrule, and optical fiber configured in accordance with the present invention;

FIG. 1b is an enlarged view of the tip of the optical fiber shown in FIG. 1a;

FIG. 1c is a cross-sectional view of the hermetic stub fiber body, ferrule, and optical fiber shown in FIG. 1a;

FIG. 2b is an enlarged end view of the hermetic stub fiber assembly shown in and taken along line 2b-2b of FIG. 1a; and FIG. 3 is a cut away view of the hermetic stub fiber body, ferrule, and optical fiber shown in FIG. 1a.

DETAILED DESCRIPTION OF THE PREFERRED EMBODIMENT

Figure 2B:
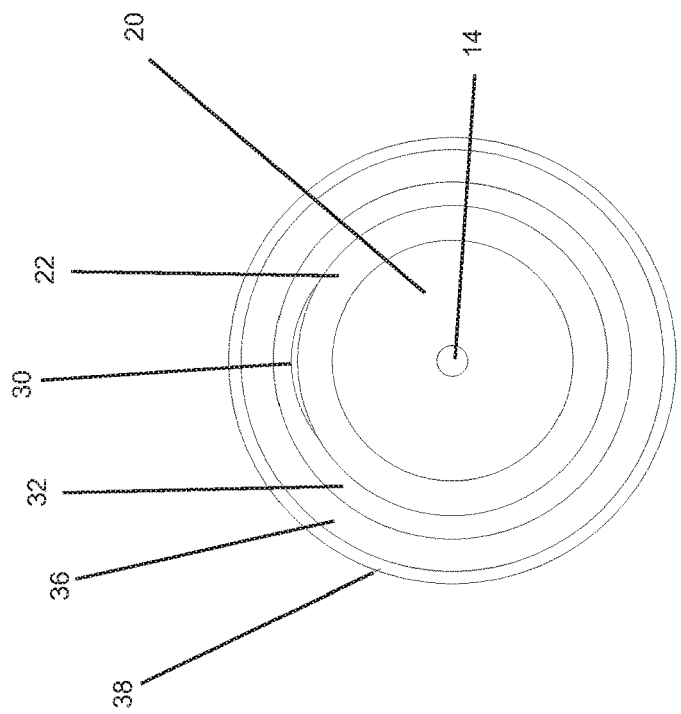

Referring now to the drawings, FIG. 1a is a side view of a hermetic fiber stub body 10 configured in accordance with the present invention. An optical fiber 14 and a ferrule 20 are connected to an opposing first or front end 15 and a second or back end 19 of the stub body 10. Support resin 16 is applied on top of a low melting point glass seal 24 (FIG. 1c) to support the mechanical transition of the optical fiber 14 exiting out of the glass seal 24. For the purpose of this application, low melting point glass is defined as glass having a melting point below 400 degrees Celsius. Without the support resin 16, the glass seal 24 and the optical fiber 14 transition or connection would be prone to breakage. The outer end or end face 21 of the ferrule 20 is tapered 22 for easier insertion into a split sleeve (not shown). The end-face 21 of the ferrule 20 and the optical fiber 14, which is glued within the ferrule 20, are both typically polished to a fine finish to allow an efficient optical connection to another connector interface via a split sleeve arrangement.

An indent marker 23 is used on the outer body of the stub body 10 to allow a user to visually rotate and align the angle on the end of fiber 14 to a receiving optical module into which the stub body 10 is normally soldered with metal solder. Additionally, the indent marker 23 can be used to rotationally orientate stress rods of the optical fiber 14 to the module body 10 if the optical fiber 14 is a polarization maintaining optical fiber. The indent or notch 23 allows the angle of the cleave 25 shown in FIG. 1b at the tip 12 of the optical fiber 14 to be rotationally aligned by a user. It is important for the polarization maintaining (PM) fiber version, as that fiber has stress rods normally angularly aligned to the cleave 25 and the whole PM orientation of the finished assembly, which needs to be easily seen by a user. In a singlemode (SM) version the indent 23 is used to enable a user to know which orientation the angled cleave 25 is relative to the whole body 10, as this can be difficult to determine.

FIG. 1b is an enlarged view of the end 12 of the optical fiber 14. The end 12 of the optical fiber 14 is cleaved, polished, cut or ablated at a slight angle 25 from being perpendicular to the longitudinal direction of the optical fiber 14 in order to prevent back reflection of optical signals being carried by the optical fiber 14. The end or tip 12 of optical fiber 14 also can be finished to be perpendicular to the longitudinal direction of the optical fiber 14 and antireflection coated at its tip 12 to reduce back reflections.

FIG. 1c is a cross-sectional view of the hermetic fiber stub body 10 shown in FIG. 1a. Illustrated are the optical fiber 14 and the support resin 16 for the glass hermetic seal 24. The support resin 16 is typically used to mechanically support the transition of the optic fiber 14 to air from the hard glass hermetic seal 24. The support resin 16 preferably is an acrylate type resin that is cured by ultraviolet (UV) light. Further illustrated in FIG. 1c is the optical fiber 14 extending completely through the stub body 10 and to the outer end 21 of the ferrule 20. The ferrule tip or end 21 may have a chamfer 22. A pass-through or smaller inner channel 17 is provided into which the optical fiber 14 is typically hermetically sealed with the glass seal 24, for example, which is low melting point glass. The smaller inner chamber 17 opens to the first end 15 of the stub body 10 via an aperture 27. A larger inner chamber 18 is shown within the stub body 10. The optical fiber 14 passes through the support resin 16, the glass seal 24, the channel 17, the inner chamber 18, and the ferrule 20. The hermetic glass seal 24 forms a hermetic seal around the optical fiber 14 between the support resin 16 and in the channel 17. The extension 36 of the stub body 10, epoxy resin 26, and vent slot or groove 30 also are shown in FIG. 1c, but will be described in more detail in regard to FIG. 2a.

Figure 2A:
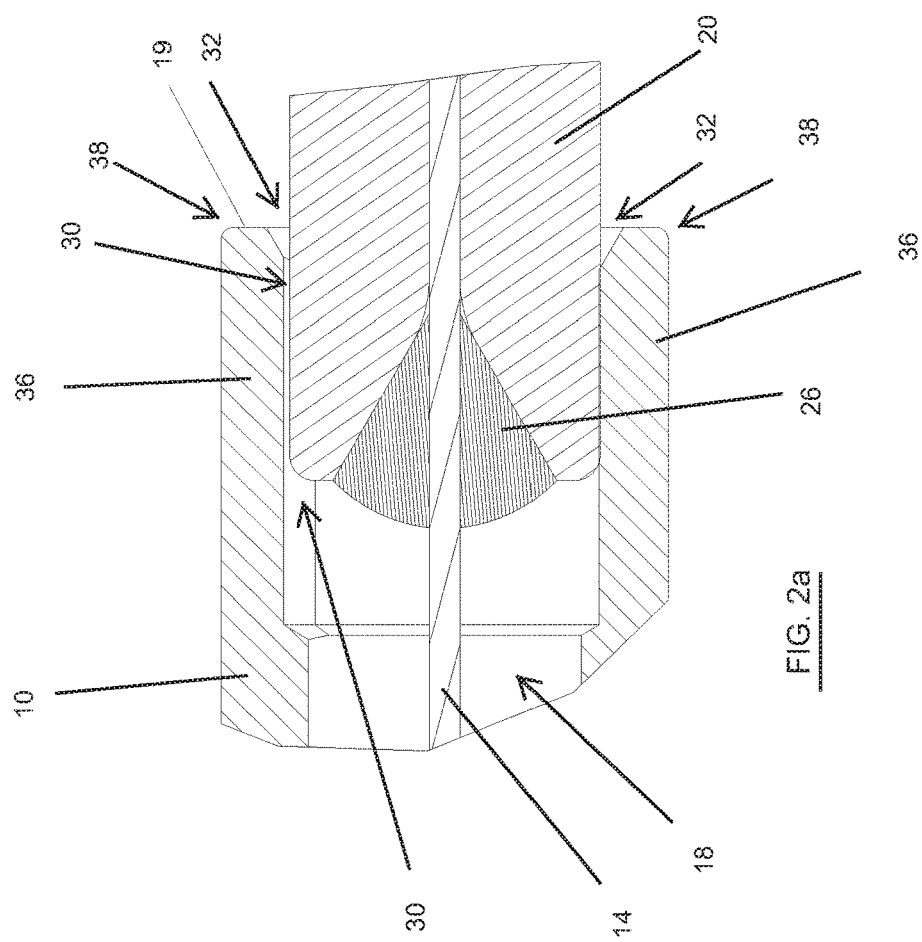
FIG. 2a is an enlarged cross-sectional view of the mechanical interface configuration between the ferrule and fiber stub body shown in FIG. 1c.

FIG. 2a is an enlarged cross-sectional view of the end of the optical ferrule 20 within the hermetic stub body 10, and the optical fiber 14 shown in FIG. 1c. Further illustrated is the epoxy resin 26 used for optical fiber termination within the ferrule 20. The optical fiber 14 is shown extending into the stub body 10 and through the ferrule 20. The channel 18 is shown within the stub body 10. Chamfers or rounded ends 38 are included on the end 19 of extension 36 of the stub body 10. The vent slot or groove 30 is shown allowing gasses created at the opposing end of the fiber stub 10 to pass out of chamber 18 to the outside through a chamfer or bevel 32 at the outside end of the vent 30.

FIG. 2b is an enlarged end view of the assembly shown in and taken along line 2b-2b of FIG. 1a looking towards the ferrule end 22. In accordance with the present invention, Illustrated is the vent 30 between the chamfer 22 of the ferrule 20 and the bevel 32 on the extension 36 of the stub body 10. Also shown are the chamfer or rounded end 38 on the extension 36 of the stub body 10 and the optical fiber 14 within the ferrule 20.

In accordance with the present invention, a notch, groove, scallop, slot, or gas vent 30 is located between the extension 36 of the fiber stub body 10 and the ferrule 20. The gas vent 30 enables gas created during the hermetic glass sealing process of the low melting glass seal 24, as shown in FIG. 1c, to pass into the inner chambers 17 and 18 of the hermetic fiber stub body 10, exhausting safely past ferrule 20, through vent 30, and out bevel 32 without damaging the integrity of the hermetic glass seal material 24 during and after the hermetic glass sealing process.

A user will typically metal solder the stub body 10 into a hole or pipe in a module about half way along the length of the stub body 10. The metal solder hermetically seals the stub body 10 to the module wall within which the stub body 10 is to be located. The tip of the optical fiber 14 located within the ferrule 20 is then coupled to an emitter or detector, which is protected from the outside environment by the metal solder seal of the stub body 10 to a module box, and furthermore, outside elements or materials in the environment that may pass around the ferrule 20 and into the cavity 18, are then blocked from going into the stub body 10 by the glass seal 24.

Figure 3:
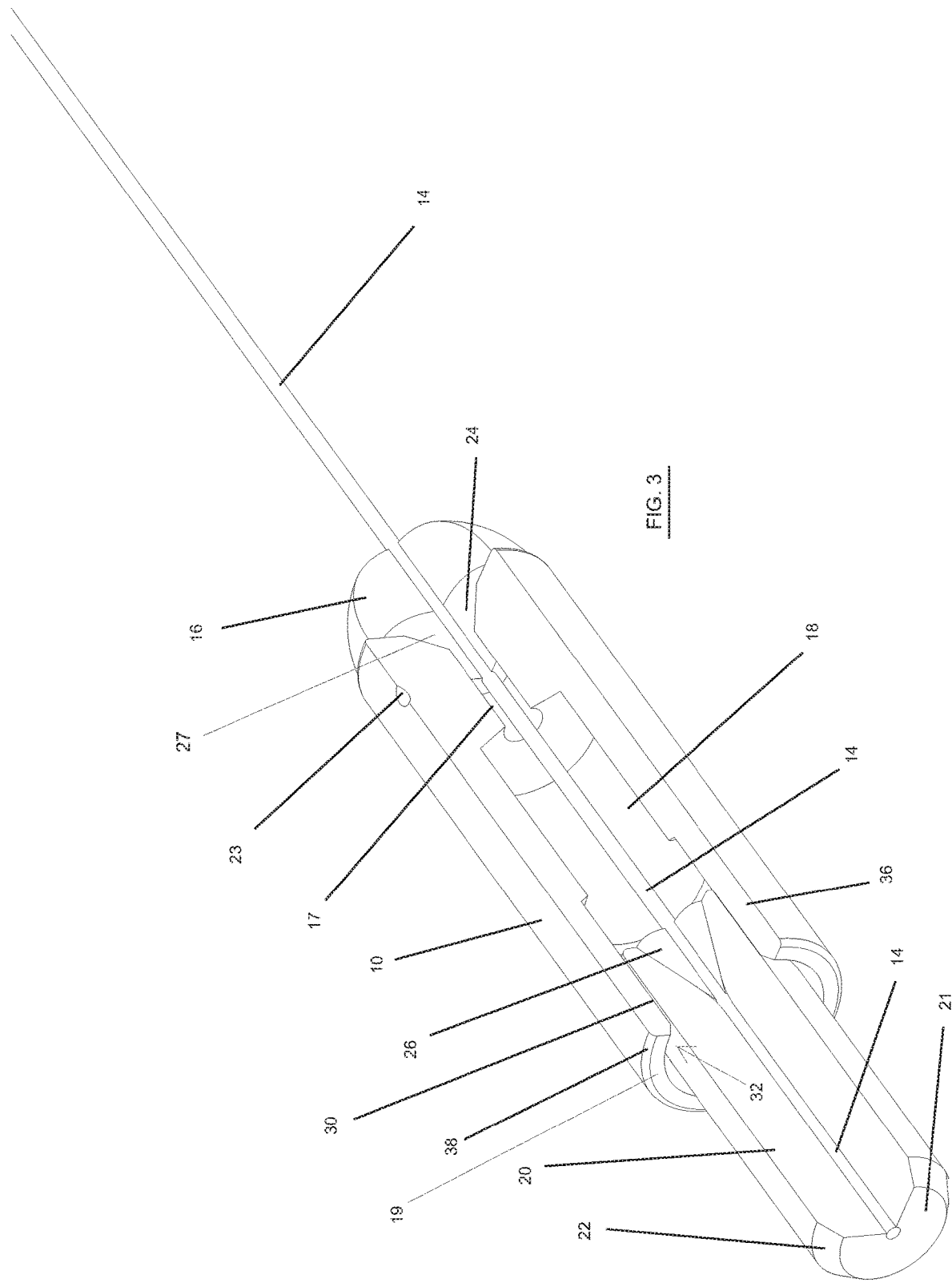

FIG. 3 is a cut away view of the hermetic stub body 10, the ferrule 20, and the optical fiber 14, shown in FIGS. 1a, 1c, 2a, and 2b. Also shown are the indent or notch 23, the outer end 21 and chamfer 22 of the ferrule 20, and the rounded end 38 of the extension 36 of the stub body 10. The smaller inner chamber 17 and the larger inner chamber 18 are shown, as well as the support resin 16, the hermetic glass seal 24, and the epoxy or resin 26 used for optical fiber termination. In accordance with the present invention, the gas vent 30 and bevel 32 at the outer end 19 of the extension 36 are further illustrated.

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. An optical fiber stub assembly, comprising:
   a stub body having longitudinal configuration, a smaller inner chamber, a larger inner chamber, a first end, and a second end;
   a ferrule located within the larger chamber and extending out the second end of the stub body;
   an optical fiber having one end extending beyond the first end of the optical fiber and through the smaller inner chamber, the larger inner chamber, and a second end of the optical fiber is flush with an outer end of the ferrule that extends out beyond the second end of the stub body; and
   a vent is provided between an other perimeter of the ferrule and an inner surface of the larger chamber that passes from the larger inner chamber to an exterior of the stub body, wherein the vent enables gases generated during a sealing process of the optical fiber within stub body to escape.

2. The optical fiber stub assembly of claim 1, further comprising:
   a low melting point glass seal on the first end of the stub body for securing the optical fiber to the first end and within the smaller inner chamber of the stub body.

3. The optical fiber stub assembly of claim 2, further comprising:
   a resin on the low melting point glass seal at the first end of the stub body to support transition of the optical fiber exiting out of the low melting point glass seal.

4. The optical fiber stub assembly of claim 3, wherein an end of the optical fiber extending out the first end of the stub body includes a cleave, and further comprising:
   an indent marker on an outer surface of the stub body to allow a user to visually rotate and align an angle on a cleave at an end of the optical fiber extending out the first end of the stub body to a receiving optical module into which the stub body is typically soldered.

5. The optical fiber stub assembly of claim 4, wherein the smaller inner chamber extends through and out an aperture in the first end of the stub body, and the optical fiber passed through and out the aperture in the first end o the stub body, and the optical stub fiber further comprising:
   melted glass forming a hermetic seal around the optical fiber extending through the smaller inner chamber and larger inner chamber, where the melted glass hermetically seals the aperture in the first end of the stub body.

6. The optical fiber stub assembly of claim 5, wherein the melted glass is low temperature melting glass.

7. The optical fiber stub assembly of claim 5, further comprising:
   a resin on the first end of the stub body covering exposed outer surface of the melted glass hermetically sealing the aperture on the first end of the stub body, wherein the resin supports transition of the optical fiber passing out of the melted glass in order to prevent breakage of the optical fiber adjacent to the melted glass.

8. The optical fiber stub assembly of claim 5, wherein an outer end of the optical fiber includes a cleave.

9. The optical fiber stub assembly of claim 1, further comprising:
   epoxy resin securing the optical fiber within the ferrule.

10. The optical fiber stub assembly of claim 2, wherein a bevel is formed at an opening of the vent to ambient environment.

11. The optical fiber stub assembly of claim 5, wherein an outer end of the optical fiber is polished to form a lens.

12. The optical fiber stub assembly of claim 5, wherein an outer end of the optical fiber is ablated to form a lens.

* * * * *